US012198833B2

(12) United States Patent
Knerr

(10) Patent No.: US 12,198,833 B2
(45) **Date of Patent: *Jan. 14, 2025**

(54) MAGNET WIRE WITH CORONA RESISTANT POLYIMIDE INSULATION

(71) Applicant: Essex Furukawa Magnet Wire USA LLC, Atlanta, GA (US)

(72) Inventor: Allan R. Knerr, Fort Wayne, IN (US)

(73) Assignee: ESSEX SOLUTIONS USA LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,426

(22) Filed: Jun. 26, 2023

(65) Prior Publication Data

US 2023/0335309 A1 Oct. 19, 2023

Related U.S. Application Data

(63) Continuation of application No. 17/731,350, filed on Apr. 28, 2022, now Pat. No. 11,728,068, which is a continuation-in-part of application No. 17/316,333, filed on May 10, 2021, now Pat. No. 11,352,521, which is a continuation-in-part of application No. 17/003,503, filed on Aug. 26, 2020, now Pat. No. 11,004,575, which is a continuation-in-part of application No. 16/403,665, filed on May 6, 2019, now Pat. No. 10,796,820.

(60) Provisional application No. 62/667,649, filed on May 7, 2018.

(51) Int. Cl.
*H01B 3/30* (2006.01)

(52) U.S. Cl.
CPC ............. *H01B 3/306* (2013.01); *H01B 3/305* (2013.01)

(58) Field of Classification Search
CPC .............. H01B 7/02; H01B 7/04; H01B 7/06; H01B 7/0216; H01B 7/2813; H01B 3/305; H01B 3/306; H01B 7/00
USPC ................. 174/110 R–110 N, 120 R–122 SR
See application file for complete search history.

(56) References Cited

U.S. PATENT DOCUMENTS

| | | | | |
|---|---|---|---|---|
| 2,809,229 A * | 10/1957 | Eckels | H01B 7/38 | 174/117 R |
| 3,554,984 A * | 1/1971 | Edwards et al. | C08G 73/14 | 528/331 |

(Continued)

FOREIGN PATENT DOCUMENTS

| | | |
|---|---|---|
| CN | 101824268 | 9/2010 |
| CN | 1265771 | 6/2012 |

(Continued)

OTHER PUBLICATIONS

Notification of Transmittal of the International Search Report and the Written Opinion of the International Searching Authority, or the Declaration for PCT/US2019/030804, mailed Aug. 27, 2019.

(Continued)

*Primary Examiner* — William H. Mayo, III

(57) ABSTRACT

Magnet wire with corona resistant enamel insulation may include a conductor, and at least one layer of polymeric enamel insulation may be formed around the conductor. The polymeric enamel insulation may include a filler dispersed in a base polyimide material. Additionally, the polymeric enamel insulation may have a thermal index of at least 260° C.

20 Claims, 2 Drawing Sheets

(56) References Cited

U.S. PATENT DOCUMENTS

| | | | | | |
|---|---|---|---|---|---|
| 4,005,056 | A * | 1/1977 | Dunwald | C08G 18/3825 | 528/53 |
| 4,273,829 | A * | 6/1981 | Perreault | H01B 7/0275 | 174/110 V |
| 4,381,362 | A * | 4/1983 | Biggs | C08K 5/372 | 524/264 |
| 4,430,384 | A | 2/1984 | George | | |
| 4,447,797 | A * | 5/1984 | Saunders | H01B 3/40 | 174/120 SR |
| 4,537,804 | A | 8/1985 | Keane | | |
| 4,597,804 | A * | 7/1986 | Imaoka | H01L 21/324 | 257/E21.321 |
| 4,760,296 | A * | 7/1988 | Johnston | H01B 3/006 | 310/196 |
| 4,935,302 | A | 6/1990 | Hjortsberg | | |
| 5,654,095 | A * | 8/1997 | Yin | H02K 3/30 | 174/120 SR |
| 5,861,578 | A | 1/1999 | Hake et al. | | |
| 6,100,474 | A | 8/2000 | McGregor et al. | | |
| 6,136,436 | A | 10/2000 | Kennedy et al. | | |
| 6,337,442 | B1 * | 1/2002 | Lienert | H01B 3/306 | 174/120 R |
| 6,352,230 | B2 * | 3/2002 | Grossman | E02D 29/0283 | 248/351 |
| 6,403,890 | B1 | 6/2002 | McGregor et al. | | |
| 6,437,249 | B1 * | 8/2002 | Higashiura | H01B 3/427 | 174/120 R |
| 7,015,260 | B2 | 3/2006 | Meloni | | |
| 7,253,357 | B2 * | 8/2007 | Cipelli | H01B 3/306 | 174/110 R |
| 9,330,814 | B2 | 5/2016 | Hisada et al. | | |
| 9,443,643 | B2 | 9/2016 | Muto et al. | | |
| 9,536,634 | B2 | 1/2017 | Choi et al. | | |
| 10,020,092 | B2 | 7/2018 | Oya | | |
| 10,796,820 | B2 | 10/2020 | Knerr | | |
| 2002/0142161 | A1 | 10/2002 | Grimes | | |
| 2005/0118422 | A1 * | 6/2005 | Cipelli | H01B 3/306 | 428/375 |
| 2008/0289850 | A1 * | 11/2008 | Mhetar | H01B 3/441 | 524/505 |
| 2009/0226720 | A1 | 9/2009 | Kikuchi et al. | | |
| 2012/0080970 | A1 | 4/2012 | Yin | | |
| 2012/0285724 | A1 * | 11/2012 | Oya | H01B 3/427 | 174/120 C |
| 2015/0243410 | A1 * | 8/2015 | Knerr | H02K 3/32 | 310/198 |
| 2016/0233003 | A1 * | 8/2016 | Caudill | H01B 3/081 | |
| 2018/0244846 | A1 | 8/2018 | Flanagan et al. | | |
| 2020/0395145 | A1 | 12/2020 | Knerr | | |
| 2020/0402684 | A1 * | 12/2020 | Tanaka | H01B 13/228 | |
| 2021/0261817 | A1 | 8/2021 | Knerr | | |
| 2022/0199284 | A1 | 6/2022 | Renato et al. | | |

FOREIGN PATENT DOCUMENTS

| | | |
|---|---|---|
| CN | 102490426 | 6/2012 |
| CN | 108648884 | 10/2018 |
| CN | 109659078 | 4/2019 |
| CN | 112424879 | 6/2022 |
| EP | 4020503 | 6/2022 |
| JP | 2010070672 | 4/2010 |
| WO | 9833190 | 7/1998 |
| WO | 2017042159 | 3/2017 |

OTHER PUBLICATIONS

European search report in EP Application No. 23170085.7. Mailed Sep. 27, 2023.

European search report in EP Application No. 23170101.2 Mailed Sep. 27, 2023.

European search report in EP Application No. 19799445.2 Mailed Dec. 14, 2021.

* cited by examiner

MAGNET WIRE WITH CORONA RESISTANT POLYIMIDE INSULATION

CROSS-REFERENCE TO RELATED APPLICATION

This application is a continuation of U.S. Pat. No. 11,728,068, filed Apr. 28, 2022 and entitled "Magnet Wire with Corona Resistant Polyimide Insulation", which is a continuation-in-part of U.S. Pat. No. 11,352,521, filed May 10, 2021 and entitled "Magnet Wire with Corona Resistant Polyamideimide Insulation", which is a continuation-in-part of U.S. Pat. No. 11,004,575, filed Aug. 26, 2020 and entitled "Magnet Wire with Corona Resistant Polyimide Insulation", which is a continuation-in-part of U.S. Pat. No. 10,796,820, filed May 6, 2019 and entitled "Magnet Wire with Corona Resistant Polyimide Insulation", which claims priority to U.S. Provisional Application No. 62/667,649, filed May 7, 2018 and entitled "Corona Resistant Polyimide Magnet Wire Insulation". The contents of each of these prior matters is incorporated by reference herein in its entirety.

TECHNICAL FIELD

Embodiments of the disclosure relate generally to magnet wire and, more particularly, to magnet wire that includes insulation formed from corona resistant polyimide designed to improve the life and thermal conductivity of motor windings.

BACKGROUND

Magnet wire, also referred to as winding wire or magnetic winding wire, is utilized in a wide variety of electric machines and devices, such as inverter drive motors, motor starter generators, transformers, etc. Magnet wire typically includes polymeric enamel insulation formed around a central conductor. The enamel insulation is formed by applying a varnish onto the magnet wire and curing the varnish in an oven to remove solvents, thereby forming a thin enamel layer. This process is repeated until a desired enamel build or thickness has been attained. Polymeric materials utilized to form enamel layers are intended for use under certain maximum operating temperatures. Additionally, electrical devices may be subject to relatively high voltage conditions that may break down or degrade the wire insulation. For example, an inverter may generate variable frequencies that are input into certain types of motors, and the variable frequencies may exhibit steep wave shapes that cause premature motor winding failures.

Attempts have been made to reduce premature failures as a result of degradation of the wire insulation. These attempts have included minimizing damage to the wire and insulation during handling and manufacture of electric machines and devices, and using shorter lead lengths where appropriate. Further, a reactor coil or a filter between an inverter drive and a motor can extend the life of the windings by reducing the voltage spikes and high frequencies generated by the inverter drive/motor combination. However, such coils are expensive and add to the overall cost of the system. Increasing the amount of insulation can improve the life of the windings in an electrical device, but this option is both expensive and decreases the amount of space for the copper in the device, thereby producing a less efficient motor. Additionally, inter layer delamination may occur once a certain number of enamel layers has been reached. Therefore, there is an opportunity for improved magnet wire with insulation designed to withstand higher temperatures and/or voltages present within electrical devices for longer periods of time.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Figure 1A:
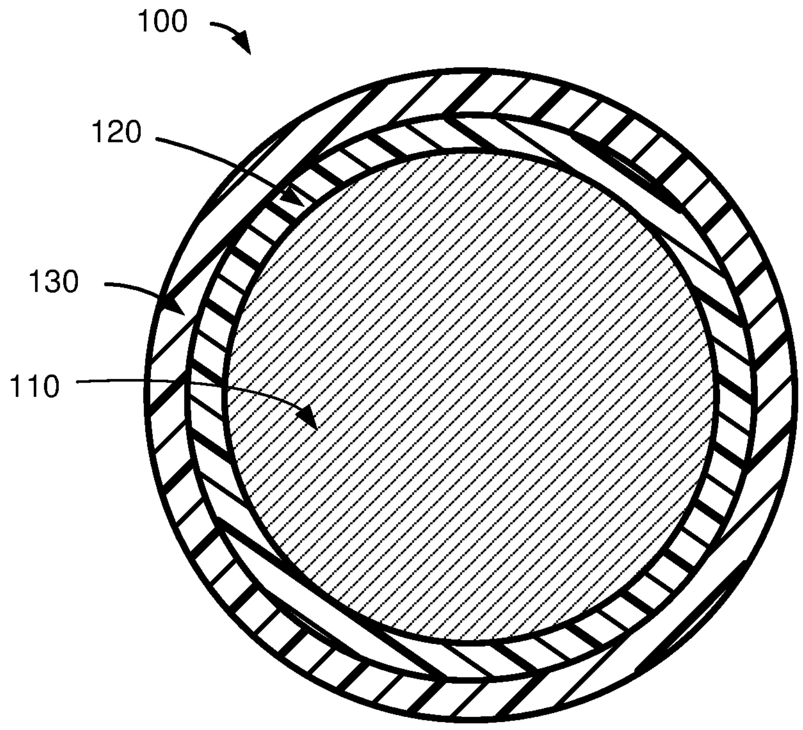
FIGS. 1A-2B illustrate cross-sectional views of example magnet wire constructions that may be formed in accordance with various embodiments of the disclosure.

Certain embodiments of the present disclosure are directed to magnet wire that includes polyimide ("PI") insulation having improved corona resistance, thermal conductivity, and/or thermal life enhancement relative to conventional magnet wire with polyimide insulation. Other embodiments of the disclosure are directed to methods of making magnet wire that includes PI insulation having improved corona resistance, thermal conductivity, and/or thermal life enhancement. According to an aspect of the disclosure, filler material may be added to a PI polymer or resin. Example filler materials may include a blend of at least titanium(IV) oxide ($TiO_2$) and silica oxide ($SiO_2$). A blend may additionally include other suitable materials as desired, such as chromium(III) oxide ($Cr_2O_3$). The addition of the filler may improve the corona resistance and/or thermal life of an enamel layer formed from filled PI on a magnet wire. As a result, the life of the magnet wire and/or an electrical device (e.g., motor, etc.) incorporating the magnet wire may be increased or extended under partial discharge and/or other adverse conditions. The addition of the filler may also improve the thermal conductivity of the magnet wire. In particular, the filler may facilitate enhanced heat dissipation from the conductor. Additionally, one or more additives may be incorporated into the PI insulation along with the filler material. At least one additive may include an amine moiety reacted with an aldehyde. For example, a Cymel material may be utilized as an additive. The one or more additives may serve a wide variety of purposes, such as promoting adhesion between components and/or layers of a magnet wire, enhancing the flexibility of the filled polymeric insulation, improving moisture resistance of the magnet wire, and/or improving heat resistance.

Filler material may be added to PI at any suitable ratio. For example, in certain embodiments, a total amount of filler in a filled PI enamel insulation layer may be between approximately ten percent (10%) and approximately twenty-five percent (25%) by weight. In other embodiments, a total amount of filler may be between approximately fifteen percent (15%) and approximately twenty percent (20%) by weight. In various other embodiments, a total amount of filler may be approximately 5, 7.5, 10, 12.5, 15, 17.5, 20, 25, 30, 35, 40, 45, or 50 percent by weight, an amount included in a range between any two of the above values, or an amount included in a range bounded on either a minimum or maximum end by one of the above values.

Further, a wide variety of blending or mixing ratios may be utilized for various components incorporated into a filler. For example, titanium(IV) oxide and silica oxide may be blended at a wide variety of suitable ratios by weight. In various embodiments, a filler may include between approximately twenty percent (20%) and approximately eighty percent (80%) by weight of silica oxide and between approximately twenty percent (20%) and approximately eighty (80%) by weight of titanium(IV) oxide. For example, a filler may include 20-40% by weight silica oxide and 60-80% by weight of titanium(IV) oxide. A wide variety of other suitable blending ratios may be utilized as desired.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to the drawings, FIG. 1A shows a cross-sectional end-view of an example round magnet wire 100, which may include a conductor 110 coated with enamel insulation. Any suitable number of enamel layers may be utilized as desired. As shown, a plurality of layers of enamel insulation, such as a base coat 120 and a topcoat 130, may be formed around the conductor 110. In other embodiments, a single layer of enamel insulation may be utilized. In yet other embodiments, more than two layers of enamel insulation may be utilized. Further, one or more of the enamel layers may include a suitable inorganic filler, and the filler may include a combination of silica oxide and titanium(IV) oxide.

Figure 1B:
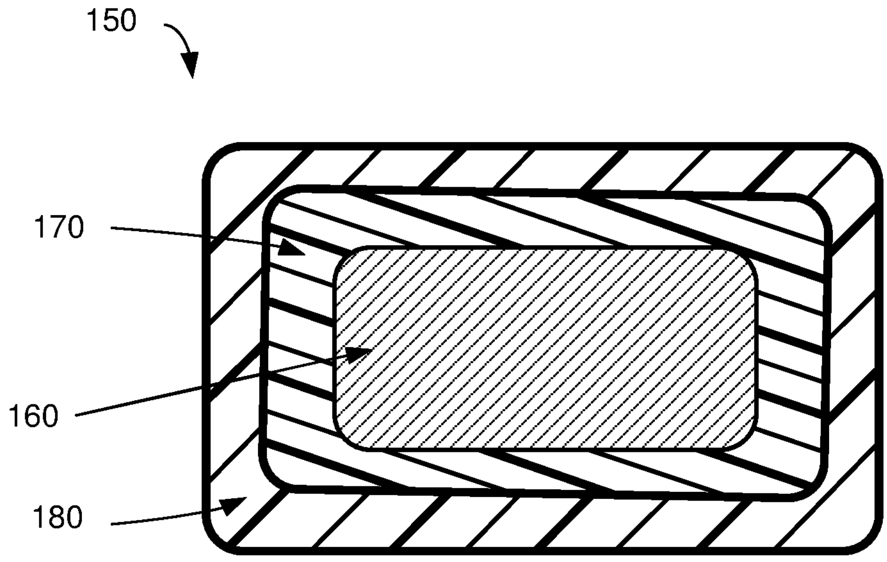

Similarly, FIG. 1B shows a cross-sectional end-view of an example rectangular magnet wire 150, which may include a conductor 160 coated with enamel insulation. Any suitable number of enamel layers may be utilized as desired. As shown, a plurality of layers of enamel insulation, such as a base coat 170 and a topcoat 180, may be formed around the conductor 160. In other embodiments, a single layer of enamel insulation may be utilized. In yet other embodiments, more than two layers of enamel insulation may be utilized. Further, one or more of the enamel layers may include a suitable inorganic filler, and the filler may include a combination of silica oxide and titanium(IV) oxide. The round wire 100 of FIG. 1A is described in greater detail below; however, it will be appreciated that various components of the rectangular wire 150 of FIG. 1B may be similar to those described for the round wire 100 of FIG. 1A.

The conductor 110 may be formed from a wide variety of suitable materials or combinations of materials. For example, the conductor 110 may be formed from copper, aluminum, annealed copper, oxygen-free copper, silver-plated copper, nickel plated copper, copper clad aluminum ("CCA"), silver, gold, a conductive alloy, a bimetal, or any other suitable electrically conductive material. Additionally, the conductor 110 may be formed with any suitable cross-sectional shape, such as the illustrated circular or round cross-sectional shape. In other embodiments, a conductor 110 may have a rectangular (as shown in FIG. 1B), square, elliptical, oval, or any other suitable cross-sectional shape. As desired for certain cross-sectional shapes such as a rectangular shape, a conductor may have corners that are rounded, sharp, smoothed, curved, angled, truncated, or otherwise formed. The conductor 110 may also be formed with any suitable dimensions, such as any suitable gauge, diameter, height, width, cross-sectional area, etc.

Any number of layers of enamel, such as the illustrated base coat 120 and topcoat 130, may be formed around the conductor 110. An enamel layer is typically formed by applying a polymeric varnish to the conductor 110 and then baking the conductor 110 in a suitable enameling oven or furnace. The polymeric varnish typically includes thermosetting polymeric material or resin suspended in one or more solvents. A thermosetting or thermoset polymer is a material that may be irreversibly cured from a soft solid or viscous liquid (e.g., a powder, etc.) to an insoluble or cross-linked resin. Thermosetting polymers typically cannot be melted for application via extrusion as the melting process will break down or degrade the polymer. Thus, thermosetting polymers are suspended in solvents to form a varnish that can be applied and cured to form enamel film layers. Following application of a varnish, solvent is removed as a result of baking or other suitable curing, thereby leaving a solid polymeric enamel layer. As desired, a plurality of layers of enamel may be applied to the conductor 110 in order to achieve a desired enamel thickness or build (e.g., a thickness of the enamel obtained by subtracting the thickness of the conductor and any underlying layers). Each enamel layer may be formed utilizing a similar process. In other words, a first enamel layer may be formed, for example, by applying a suitable varnish and passing the conductor through an enameling oven. A second enamel layer may subsequently be formed by applying a suitable varnish and passing the conductor through either the same enameling oven or a different enameling oven. Indeed, an enameling oven may be configured to facilitate multiple passes of a wire through the oven. As desired in various embodiments, other curing devices may be utilized in addition to or as an alternative to one or more enameling ovens. For example, one or more suitable infrared light, ultraviolet light, electron beam, and/or other curing systems may be utilized.

As desired, each layer of enamel, such as the base coat 120 and the topcoat 130, may be formed with any suitable number of sublayers. For example, the base coat 120 may include a single enamel layer or, alternatively, a plurality of enamel layers or sublayers that are formed until a desired build or thickness is achieved. Similarly, the topcoat 130 may include one or a plurality of sublayers. Each layer of enamel and/or a total enamel build may have any desired thickness, such as a thickness of approximately 0.0002, 0.0005, 0.007, 0.001, 0.002, 0.003, 0.004, 0.005, 0.006, 0.007, 0.008, 0.009, 0.010, 0.012, 0.015, 0.017, or 0.020 inches, a thickness included in a range between any two of the aforementioned values, and/or a thickness included in a range bounded on either a minimum or maximum end by one of the aforementioned values.

A wide variety of different types of polymeric materials may be utilized as desired to form an enamel layer. Examples of suitable thermosetting materials include, but are not limited to, polyimide, polyamideimide, amideimide, polyester, polyesterimide, polysulfone, polyphenylenesulfone, polysulfide, polyphenylenesulfide, polyetherimide, polyamide, polyketones, etc. According to an aspect of the disclosure, at least one enamel layer may include polyimide ("PI"). In certain embodiments, a plurality of polyimide layers may be formed. For example, both the base coat 120 and the topcoat 130 may be formed as PI layers. In other embodiments, one or more PI layers may be combined with enamel layers formed from other types of material. For example, the base coat 120 may be formed from PI while the topcoat 130 includes another polymeric material or blend of polymeric materials. Additionally, according to an aspect of the disclosure and as explained in greater detail below, one or more PI layers may include a suitable filler.

In certain embodiments, the base coat 120 may include one or more layers of filled PI, and a topcoat 130 that includes polyamideimide ("PAI") may be formed over the base coat 120. As desired, any suitable build or thickness ratio between the PI base coat 120 and the PAI topcoat 130 may be utilized. In certain embodiments, a thickness or build ratio between the PI base coat 120 and the PAI topcoat 130 may be between approximately 95/5 and approximately 85/15. In other words, the thickness or build of the PAI topcoat 130 may constitute between approximately 5.0 percent and approximately 15.0 percent of the overall thickness or build of the combined enamel insulation. In other embodiments, the topcoat 130 may constitute approximately 2, 3, 5, 7, 10, 12, 15, 20, or 25 percent of the overall thickness or build of the combined enamel insulation.

Figure 2A:
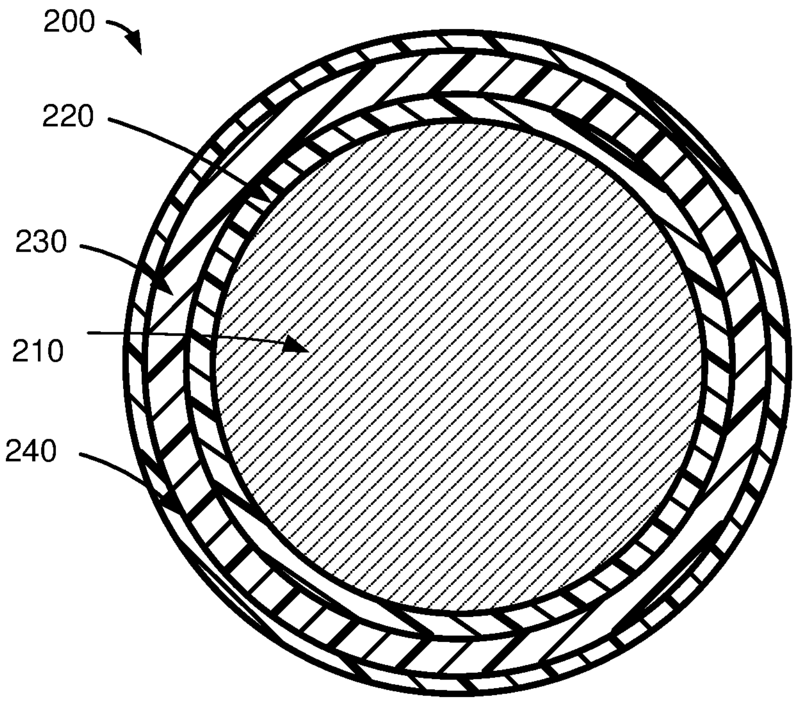
Figure 2B:
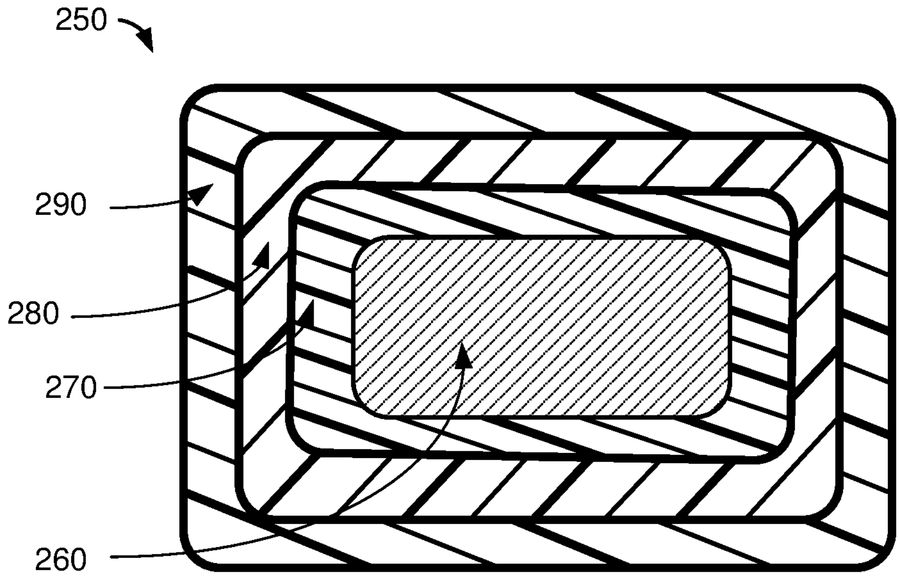

FIG. 2A shows a cross-sectional end-view of an example three-coat round magnet wire 200. The embodiment shown in FIG. 2A includes a conductor 210 surrounded by a polymeric base coat 220, a first polymeric layer 230 disposed on the base coat 220, and a second polymeric layer 240 disposed on the first polymeric layer 230. Similarly, FIG. 2B shows a cross-sectional end-view of an example three-coat rectangular magnet wire 250. The wire 250 includes a conductor 260 surrounded by a polymeric base coat 270, a first polymeric layer 280 disposed on the base coat 270, and a second polymeric layer 290 disposed on the first polymeric layer 280. The round wire 200 of FIG. 2A is described in greater detail below; however, it will be appreciated that various components of the rectangular wire 250 of FIG. 2B may be similar to those described for the round wire 200 of FIG. 2A.

With respect to the wire 200 of FIG. 2A, the conductor 210 may be similar to the conductor 110 described above with reference to FIG. 1A. Additionally, a wide variety of suitable polymers may be utilized to form the various layers of enamel 220, 230, 240. Examples of suitable thermosetting materials include, but are not limited to, polyimide, polyamideimide, amideimide, polyester, polyesterimide, polysulfone, polyphenylenesulfone, polysulfide, polyphenylenesulfide, polyetherimide, polyamide, polyketones, etc. According to an aspect of the disclosure, at least one enamel layer may include polyimide ("PI"). Additionally, each of the base coat 220, first polymeric layer 230, and second polymeric layer 240 may include any desired number of sublayers. In certain embodiments, a plurality of PI layers may be formed. For example, all three layers 220, 230, 240 may be formed from PI.

In other embodiments, one or more PI layers may be combined with enamel layers formed from other types of material. For example, the base coat 220 may be formed from PAI or another polymeric material that promotes enhanced adhesion between the conductor 210 and the insulation formed around the conductor. The first polymeric layer 230 may then be formed from any suitable number of filled PI layers. The second polymeric layer 240 may then be formed as a topcoat over the filled PI layers. For example, the second polymeric layer 240 may be formed as a PAI topcoat similar to the topcoat 130 discussed above with reference to FIG. 1A.

As another example, the base coat 220 and the first polymeric layer 230 may be formed as PI layers. For example, the base coat 220 may be formed form PI that promotes enhanced adhesion to the conductor 210. In certain embodiments, the base coat 220 may be formed from PI having a different formulation than PI used in the first polymeric layer 230. For example, the base coat 220 may include PI formed by reacting a dianhydride component (e.g., pyrometllitic dianhydride or PMDA) with a diamine component that contains 2,2-bis[4-(4-aminophenoxy)phenyl] propane ("BAPP"). The first polymeric layer 230 may include PI formed by reacting a dianhydride component with 4,4'-oxydianiline ("ODA"). The second polymeric layer 240 may then be formed as a topcoat over the filled PI layers. For example, the second polymeric layer 240 may be formed as a PAI topcoat similar to the topcoat 130 discussed above with reference to FIG. 1A.

Indeed, a wide variety of suitable combinations of enamel may be formed as desired from any suitable materials and/or combinations of materials. Additionally, similar to the wire 100 of FIG. 1A, the wire 200 of FIG. 2A may include at least one PI layer that includes a suitable filler. In certain embodiments, one or more filled PI layers may be formed around the conductor 210 (e.g., directly around the conductor 210, around one or more base layers, etc.). One or more unfilled layers or self-lubricating layers, such as an unfilled topcoat (e.g., an unfilled second polymeric layer 240), may then be formed around the one or more filled PI layers. For example, an unfilled layer of PI or an unfilled layer of PAI may be formed over the one or more filled PI layers. The unfilled layer(s) may assist in decreasing tooling wear associated with the abrasive materials utilized as fillers in the filled PI layers.

With continued reference to the wires 100, 150, 200, 250 of FIGS. 1A-2B, in certain embodiments, one or more suitable additives may be incorporated into one or more enamel layers. An additive may serve a wide variety of suitable purposes, such as promotion of adhesion between various components and/or layers of a wire, enhancing the flexibility of the insulation incorporated into a wire, enhancing moisture resistance, and/or promoting higher temperature stability. For example, an additive may function as an adhesion promoter to assist or facilitate greater adhesion between a conductor and a base coat, as well as between the filler material(s) and the base polymeric material. As another example, an additive may function as an adhesion promoter to assist or facilitate greater adhesion between two different layers of enamel. As another example, an additive may enhance the flexibility of magnet wire insulation. A wide variety of suitable additives may be utilized as desired in various embodiments. In certain embodiments, an additive may be formed from or may include a material that is formed by reacting an amine moiety with an aldehyde material (e.g., a glyoxal material, a formaldehyde material, etc.). For example, a Cymel material or resin, such as Cymel materials manufactured and marketed by Allnex, may be utilized as an additive in conjunction with PI. In other embodiments, a formaldehyde-free additive may be utilized. A suitable Cymel material or other additive may be utilized to facilitate greater adhesion between a PI enamel layer and an underlying layer (e.g., a base coat, a conductor, etc.) of a magnet wire, to bind the base PI polymeric material to the filler material, and/or to enhance the flexibility of a PI enamel layer and/or an overall insulation system. Other types of Cymel materials and/or crosslinking materials may be utilized as desired.

In other embodiments, one or more suitable surface modification treatments may be utilized on a conductor and/or any number of enamel layers to promote adhesion with a subsequently formed enamel layer. Examples of suitable surface modification treatments include, but are not limited to, a plasma treatment, an ultraviolet ("UV") treatment, a corona discharge treatment, and/or a gas flame treatment. A surface treatment may alter a topography of a conductor or enamel layer and/or form functional groups on the surface of the conductor or enamel layer that enhance or promote bonding of a subsequently formed enamel or other layer. In certain embodiments, the altered topography may also enhance or improve the wettability of a varnish utilized to form a subsequent enamel layer may altering a surface tension of the treated layer. As a result, surface treatments may reduce interlayer delamination.

As desired in certain embodiments, one or more other layers of insulation may be incorporated into a magnet wire 100, 150, 200, 250 in addition to a plurality of enamel layers. For example, one or more extruded thermoplastic layers (e.g., an extruded overcoat, etc.), semi-conductive layers, tape insulation layers (e.g., polymeric tapes, etc.), and/or conformal coatings (e.g., a parylene coating, etc.) may be incorporated into a magnet wire 100, 150, 200, 250. A wide variety of other insulation configurations and/or layer combinations may be utilized as desired. Additionally, an overall insulation system may include any number of suitable sublayers formed from any suitable materials and/or combinations of materials.

According to an aspect of the disclosure, one or more polyimide layers (and potentially other enamel layers) may include a suitable filler. For example, one or more PI enamel layers incorporated into a magnet wire, such as magnet wires 100, 150, 200, 250, may include a suitable filler. In certain embodiments, the filler may include a blend of at least titanium(IV) oxide ($TiO_2$) and silica oxide ($SiO_2$). A blend may additionally include other suitable materials as desired, such as chromium(III) oxide ($Cr_2O_3$). The addition of the filler may improve the corona resistance and/or thermal life of an enamel layer formed from filled PI on a magnet wire. As a result, the life of the magnet wire and/or an electrical device (e.g., motor, etc.) incorporating the magnet wire may be increased or extended under partial discharge and/or other adverse conditions.

In certain embodiments, the addition of the filler may also improve the thermal conductivity of a magnet wire 100, 150, 200, 250. Indeed, one or more filled PI insulation layers may function to conduct or draw heat away from the conductor of a magnet wire 100, 150, 200, 250. As a result, the magnet wire 100, 150, 200, 250 may operate at a relatively lower temperature than conventional magnet wires that do not include filled insulation layers. For example, when utilized in an electric machine, the magnet wire 100, 150, 200, 250 and/or the electric machine may operate at a temperature that is approximately 5, 6, 7, 8, 9, 10, 11, or 12 degrees Centigrade lower than conventional devices that do not utilize filled insulation layers. This improved thermal conductivity may facilitate operation of magnet wire and/or electric machines at higher voltages, thereby improving output. In various embodiments, a filled PI insulation layer may have a thermal conductivity that is at least 1.5, 2, 3, or 4 times that of an unfilled PI insulation layer. In other words, a filled PI insulation layer may have a first thermal conductivity that is at least 1.5, 2, 3, or 4 times that of a second thermal conductivity for the base PI material into which filler is added.

Filler material may be added to PI at any suitable ratio. For example, in certain embodiments, a total amount of filler in a filled PI enamel insulation layer may be between approximately ten percent (10%) and approximately twenty-five percent (25%) by weight. In other embodiments, a total amount of filler may be between approximately fifteen percent (15%) and approximately twenty percent (20%) by weight. In various other embodiments, a total amount of filler may be approximately 5, 7.5, 10, 12.5, 15, 17, 17.5, 20, 25, 30, 35, 40, 45, or 50 percent by weight, an amount included in a range between any two of the above values, or an amount included in a range bounded on either a minimum or maximum end by one of the above values. Substantial improvement in the life of windings was not observed at total filler levels much below about 5% by weight and insulation flexibility may be unacceptable at total filler levels greater than about 50% based on weight.

A wide variety of blending or mixing ratios may be utilized for various components incorporated into a filler. For example, titanium(IV) oxide and silica oxide may be blended at a wide variety of suitable ratios by weight. In various embodiments, a filler may include between approximately twenty percent (20%) and approximately eighty percent (80%) by weight of silica oxide and between approximately twenty percent (20%) and approximately eighty (80%) by weight of titanium(IV) oxide. For example, a filler may include approximately 20, 25, 30, 33, 35, 40, 45, 50, 55, 60, 65, 67, 70, 75, or 80 percent by weight of silica oxide, a weight percentage included in a range between any two of the above values (e.g., between 20% and 40%, etc.), or a weight percentage included in a range bounded on either a minimum or maximum end by one of the above values (e.g., at least 20%, etc.). Similarly, a filler may include approximately 20, 25, 30, 33, 35, 40, 45, 50, 55, 60, 65, 67, 70, 75, or 80 percent by weight of titanium(IV) oxide, a weight percentage included in a range between any two of the above values (e.g., between 20% and 40%, etc.), or a weight percentage included in a range bounded on either a minimum or maximum end by one of the above values (e.g., at least 20%, etc.). As desired a ratio of a first component (e.g., titanium(IV) oxide) to a second component (e.g., silica oxide) may be approximately 80/20, 75/25, 70/30, 67/33, 65/35, 60/40, 55/45, 50/50, 45/55, 40/60, 35/65, 33/67, 30/70, 25/75, 20/80, or any other suitable ratio.

As one example, titanium(IV) oxide and silica oxide may be blended at approximately a 75/25 ratio by weight. In other words, the filler may include approximately 75% titanium(IV) oxide and approximately 25% silica oxide by weight. In the event that a PI enamel layer includes approximately 15.0% by weight of filler, then the PI enamel layer may include approximately 11.25% by weight of titanium (IV) oxide and approximately 3.75% by weight of silica oxide. A wide variety of other filler ratios (e.g., ratio of filler within an enamel layer) and/or blending ratios (e.g., ratios of components utilized to make a filler) may be utilized as desired. The example above is not intended to be limiting.

Additionally, in certain embodiments, the components utilized in a filler may be selected based upon one or more desired properties. For example, a first filler component (e.g., titanium(IV) oxide, etc.) may be selected as an inorganic oxide having a relatively low resistivity and a second filler component (e.g., silica oxide, etc.) may be selected as an inorganic oxide having a relatively large surface area. The mixture may then be added to PI prior to formation of an enamel layer. In other words, a PI layer may include a mixture of a large surface area inorganic oxide and a low resistivity inorganic oxide. A large surface area inorganic oxide is believed to permit more energy to penetrate through the insulation, thereby reducing the degradation of the insulation caused by high voltage and high frequency wave shapes in electrical devices. Silica oxide or silica is commercially available in grades having a wide variety of specific surface areas, such as surface areas ranging from approximately 90 to approximately 550 $m^2/g$. For example, AEROSIL 90, available from Evonik Degussa Corporation, has a specific surface area of 90 $m^2/g$, and CAB-O-SIL EH-5, available from Cabot Corporation, has a specific surface area of 380 $m^2/g$. In certain embodiments, the resistance to the voltage wave shapes present in the windings of an electrical device may be improved with increasing silica surface area. Thus, silica grades having specific surface areas between approximately 380 $m^2/g$ and approximately 550 $m^2/g$ are preferred, or silica grades having specific surface areas greater than approximately 380 $m^2/g$, 550 $m^2/g$, or another threshold value may provide improved performance.

The components of a filler may include any suitable particle sizes, surface areas, and/or other dimensions. For example, a filler component may have a nominal particle size that is less than approximately one micron. In certain embodiments, a filler component may include nanoparticles. Additionally, a wide variety of suitable methods and/or techniques may be utilized to add a filler to a PI polymer. In certain embodiments, a filler may be ball-milled or otherwise ground or milled in order to reduce agglomerates to below a desired amount, such as a Hegman gauge or grind of eight "eight" or finer. These are generally made at a higher concentration and can be reduced in the final "letdown" of the end formulation. As desired, the filler may be milled or ground until that particle size is below approximately 1.0 microns. Other particle sizes may be attained as desired. The filler may be incorporated into either a PI resin, a PAI carrier resin, or another resin to form a concentrated "paste" that will later be added to the PI enamel to produce the final formulation.

In certain embodiments, the filler may be milled directly into the PI varnish in the presence of solvent. In other embodiments, the filler may be milled in another substance and then added to the PI varnish. As desired, a PI paste that includes the PI polymer and the filler may be formed. In other embodiments, the filler may be milled or blended into another polymeric paste, and the polymeric paste may then be combined with PI prior to application of an enamel layer. For example, the filler may be milled or ground into polyamideimide ("PAI") to form a PAI paste, and the PAI paste may be combined with PI prior to formation of a PI enamel layer. It will be appreciated that the addition of solvent during milling may keep the filler particles from re-agglomerating or clumping.

Once a filled paste has been dispersed in a PI polymer, the PI polymer may be applied to a conductor in any suitable manner. For example, the uncured PI insulation may be applied to magnet wire using multi-pass coating and wiping dies followed by curing at an elevated temperature (e.g., curing in an enameling oven). Any desired number of PI polymer layers may be incorporated into or formed on a magnet wire. In various embodiments, these PI layers may be formed directly around a conductor or over one or more base layers. Further, in certain embodiments, one or more layers (e.g., a polyamideimide topcoat, an extruded layer, etc.) may be formed over the PI polymer layer(s).

A magnet wire 100, 150, 200, 250 that includes one or more filled PI enamel layers may exhibit improved corona resistance, thermal conductivity, and/or thermal performance relative to conventional magnet wire enamels. For example, use of one or more filled PI enamel layers may provide a thermal class, a thermal index, or a thermal endurance 240 magnet wire or higher. In certain embodiments, the anti-oxidant properties of some fillers may also result in obtaining filled PI insulation having a thermal class, a thermal index, or a thermal endurance of 260, a thermal class, a thermal index, or a thermal endurance of 280, or greater. The addition of one or more PAI layers (e.g., a PAI topcoat) may provide additional toughness and abrasion resistance without materially reducing the thermal class of the magnet wire.

Further, the addition of one or more fillers to PI may improve inverter duty life and/or electrical machine life without negatively affecting or ruining the thermal aging of the insulation. Indeed, in certain embodiments, the addition of one or more fillers may improve or raise the thermal life of magnet wire insulation at certain temperatures. For example, use of filled PI insulation may result in a thermal life of greater than approximately 1,000, 2,000, 3,000, or 4000 hours at approximately 300° C. By contrast, conventional unfilled PI may have a thermal life between approximately 400 and 500 hours at approximately 300° C. A few examples illustrating positive results for filled PI are set forth in greater detail below.

The magnet wires 100, 150, 200, 250 described above with reference to FIGS. 1A-2B are provided by way of example only. A wide variety of alternatives could be made to the illustrated magnet wires 100, 150, 200, 250 as desired in various embodiments. For example, a wide variety of different types of insulation layers may be incorporated into a magnet wire 100, 150, 200, 250 in addition to one or more enamel layers. As another example, the cross-sectional shape of a magnet wire 100, 150, 200, 250 and/or one or more insulation layers may be altered. Indeed, the present disclosure envisions a wide variety of suitable magnet wire constructions. These constructions may include insulation systems with any number of layers and/or sublayers.

EXAMPLES

The following examples are intended as illustrative and non-limiting, and represent specific embodiments of the present invention. Unless otherwise stated, the wire samples discussed in the examples were all prepared as 18 AWG wire with a "heavy" enamel build. In other words, the wire enamels were applied to an 18 AWG copper wire using multi-pass coating and wiping dies. The "heavy" enamel build has a nominal insulation build of approximately 3.0 mils (0.0762 mm).

A first example illustrated in Table 1 compares the effects of adding one or more unfilled polyamideimide ("PAI") topcoat layers over PI enamel. The comparative samples were tested for heat aging, repeated scrape, thermal index, and thermal life at temperature.

TABLE 1

Effect of PAI topcoat on PI enamel

| Base PI | AI Topcoat | % of solvent ret. | Snap + Mandrel | X-Thru (° C.) | H. Shock @ 300° C. | Heat Aging - 48 hrs @ 240° C. | Rep. Scrape | Thermal Index ASTM 2307 | Thermal Life - Log hrs |
|---|---|---|---|---|---|---|---|---|---|
| 12 passes | None | 0.7 | Pass | >500 | 2x pass | 1x pass | 10 | 254° C. | 1368 hours @ 290° C. |
| 10 passes | 2 passes | 0.8 | Pass | >500 | 2x pass | 3x fail | 75 | 245° C. | 1368 hours @ 290° C. |
| 11 passes | 1 pass | 0.6 | Pass | >500 | 2x pass | 3x pass | 124 | | |

As shown in Table 1, the formation of a single or multi-layer PAI topcoat over PI enamel has very little effect on the thermal properties of the wire. There is a small reduction in 48 hour heat aging results; however, the thermal aging is similar between wires having only PI enamel and wires having PAI topcoats. These results are unexpected because PAI and PI are normally not used in combination with one another due to perceived differences in curing.

Additionally, as shown in the repeated scrape test, the addition of a PAI topcoat greatly enhances abrasion performance of the wire. In the repeated scrape test, a weighted needle is placed into contact with a straight piece of wire, and the needle is scraped back and forth on the wire. The results of the test illustrate a number of scrapes required before the insulation is penetrated. Further, the Techrand windability results for the wire samples were similar. Accordingly, the wire samples had similar mechanical performance.

A second example set forth in Table 2 compares various fillers that may be added to PI as either a concentrate in PI or in a PAI paste. First, Table 2 illustrates the effects of adding fillers containing titanium(IV) oxide and silica oxide in PI enamel. For the first examples shown in Table 2, the filler materials were added directly to PI in order to form a PI paste, and the PI paste was then added to PI enamel. Table 2 then illustrates enamels in which fillers have been added to PAI to form a PAI paste. The PAI paste is then added to PI enamel. PAI paste was prepared with both blends of titanium(IV) oxide and silica oxide and with blends of chromium(III) oxide and silica oxide. For each of the filled PI enamels, the filler materials were ball-milled and utilized to form either a PI paste or a PAI paste. The formed "paste" was then added to PI. In the event that a PAI paste is utilized, the overall amount of PAI in the final insulation may be up to approximately 20% by weight of the insulating resin and does not appear to compromise the thermal properties of the insulation.

TABLE 2

Comparative Filled PI and PAI Samples

| Base Material | Filler | Topcoat | % of solvent ret. | Inverter Life @ 200° C. | Snap + Mandrel | H. Shock @ 280° C. | Rep. Scrape | Thermal Aging Log hrs. |
|---|---|---|---|---|---|---|---|---|
| PI (No paste) | None | 1 pass of PAI | 0.6 | 3.7 hrs | Pass | 1x pass | 40 | ~1800 hours @ 290° C. |
| PI + PI paste + Cymel | 7.5% $TiO_2$ 7.5% $SiO_2$ | 1 pass of PAI | 1.1 | 588 hrs | Pass | 1x pass | 184 | >5800 hours @ 290° C. |
| PI + PAI paste + Cymel | 7.5% $TiO_2$ 7.5% $SiO_2$ | 1 pass of PAI | 1.1 | 528 hrs | Pass | 2x pass | 203 | >4000 hours @ 290° C. |
| PI + PAI paste with no Cymel | 7.5% $Cr_2O_3$ 7.5% $SiO_2$ | 1 pass of PAI | 0.9 | 336.9 hrs | Fail | 2x pass | 274 | 3098 hours @ 290° C. |
| PI + PAI paste + Cymel | 7.5% $Cr_2O_3$ 7.5% $SiO_2$ | 1 pass of PAI | 1.1 | 692 hrs | Pass | 2x pass | 284 | >2500 hours @ 290° C. |

In order to measure the inverter duty life, the various magnet wires were tested at Essex's Magnet Wire Testing Laboratory using an inverter drive and a three-phase motor. Typical dielectric twisted pairs were made from the wire and placed in an oven at 200° C. High voltage, high frequency wave forms from a 575-volt (1750 volt peak to peak) ac inverter drive were then sent through each of the twisted pairs. The twisted pairs, which each had about the same length, were monitored until a short circuit occurred and the time to short circuit was then recorded. The longer the time to short circuit (failure), the better the resistance to insulation degradation. The time to failure for the various magnet wire enamel formulations may be referred to as the measured or determined inverter life.

As shown in Table 2, filled PI, even filled PI containing a PAI "paste" of filler concentrate, may provide excellent inverter duty life relative to unfilled enamel materials. Additionally, filled PI may exhibit enhanced thermal aging as compared to unfilled PI materials. The addition of an adhesion promoter may improve flexibilities, reduce delamination, and improve heat shock and repeated scrape in the wire samples.

A few samples that showed excellent results include PI enamel that is filled with a combination of titanium(IV) oxide and silica oxide. This filler combination provided the best survivability results during thermal aging test. As shown, one sample wire provided over 5000 hours at 290° C. during thermal aging test, which may indicate at 280 thermal class or thermal index material.

Samples of wire prepared with filled PI enamel that includes a combination of titanium(IV) oxide and silica oxide were also compared to several conventional magnet wires. The wires with filled PI enamel included both 18 AWG heavy build copper wires and larger 12 AWG copper wires. The 18 AWG wire samples were prepared with an enamel build of 0.0032 inches, and the 12 AWG wire samples were prepared with an enamel build of 0.0043 inches. These wires were then compared to both conventional enameled wires (e.g., conventional unfilled PI wire) and to conventional wires insulated with corona resistant tapes wrapped around the conductors. The corona resistant tapes included both Kapton CR tapes manufactured by DuPont and Apical tapes manufactured by the Kaneka Corporation. Table 3 below illustrates the results of the comparisons.

A wide variety of comparative tests were performed on the various wires, including thermal endurance, pulse endurance, dielectric breakdown, and repeated scrape testing. The thermal endurance testing was performed in accordance with an ASTM D2307 standard, as set forth by ASTM International. The pulse endurance testing was performed using a Chinese GB/T 21707-2008 test method with a 100 ns rise time. The dielectric breakdown testing was performed on twisted pairs formed from the magnet wire samples in accordance with standard NEMA test procedures set forth by the National Electrical Manufacturers Association.

The repeated scrape testing was performed using a similar procedure as that discussed above with reference to Table 1.

TABLE 3

Comparison of Filled PI Samples to Conventional Wires

| | 18 AWG Filled PI | 18 AWG PI | 12 AWG Filled PI | 12 AWG with Kapton Tape | 12 AWG with Apical Tape |
|---|---|---|---|---|---|
| Build (inches) | 0.0032 | 0.0032 | 0.0043 | 0.0070 | 0.0070 |
| Thermal Endurance (° C.) | 266 | 247 | >260 | 280 | |
| Pulse Endurance (hours) | >19.7 | 0.1 | >72 | 7.3 | 42.4 |
| Inverter Life @ 200° C. | 294 hrs | 3.9 hrs | | | |
| Heat Shock Resistance | Pass @ 300° C. | Pass @ 300° C. | Pass @ 300° C. | 4/5 inches @ 300° C. | 1 inch @ 300° C. |
| Dielectric Breakdown Voltage (volts) | 11,702 | 14,600 | 14,444 | 17,202 | 19,840 |
| Dielectric Breakdown Voltage at Rated Temperature | 7,146 V @ 240° C. | 10,400 V @ 240° C. | | 10,536 V @ 280° C. | 8,930 V @ 280° C. |
| Abrasion Resistance - Repeated Scrape | 115 | 30 | 192 | N/A | N/A |

As shown in Table 3, the 18 AWG wire with filled PI has much higher pulse endurance and inverter life as compared to conventional 18 AWG wire with unfilled PI. Thus, the filled PI wire will have improved corona resistance performance relative to the unfilled PI wire.

Additionally, the 12 AWG wire with filled PI has improved pulse endurance performance as compared to 12 AWG wires insulated with wrapped corona resistant polyimide tapes. The filled PI wire also has a thinner insulation build, thereby permitting the wire to have a smaller diameter than the wires insulated with tapes. Accordingly, it may be possible to incorporate the 12 AWG filled PI wire into applications that conventionally utilize wires with corona resistant tape insulation while simultaneously providing certain improved performance characteristics. The enamel insulated wires may also be easier to process and handle than conventional wires with tape insulation. Enameled wires are capable of being taken up and spooled by automated winding machines; however, these machines can damage conventional tape insulation.

A fourth example illustrated in Table 4 compares the effects of adding fillers to PI that includes both titanium(IV) oxide and silica oxide at different blend ratios. The filler materials were blended into a paste that was added to PI prior to coating the wire samples. Additionally, the filled PI layers included approximately 15% of filler by weight. The wire samples were formed at a line speed of approximately 20 feet per minute.

TABLE 4

Effects of Silica Oxide/Titanium(IV) Oxide Filler in PI

| Filler added to PI | Blend Ratio | % of solvent ret. | Voltage Endur. (mins) | Rep. Scrape | Df @RT | Tan Delta - ° C. | Snap + Mandrel |
|---|---|---|---|---|---|---|---|
| None | N/A | 0.6 | 168 | 34 | 0.00181 | 285 | 1x |
| $TiO_2$/$SiO_2$ | 100/0 | 0.4 | 430 | 41 | 0.00525 | 176 | 2x |
| $TiO_2$/$SiO_2$ | 75/25 | 0.6 | 329 | 66 | 0.00369 | 226 | 2x |
| $TiO_2$/$SiO_2$ | 67/33 | 0.7 | 208 | 67 | 0.00318 | 229 | 2x tcc |
| $TiO_2$/$SiO_2$ | 50/50 | 0.6 | 223 | 58 | 0.00322 | 244 | 2x tcc |
| $TiO_2$/$SiO_2$ | 33/67 | 0.6 | 208 | 54 | 0.0032 | 250 | 2x tcc |
| $TiO_2$/$SiO_2$ | 25/75 | 0.6 | 238 | 52 | 0.00306 | 248 | 1x |

TABLE 4-continued

Effects of Silica Oxide/Titanium(IV) Oxide Filler in PI

| Filler added to PI | Blend Ratio | % of solvent ret. | Voltage Endur. (mins) | Rep. Scrape | Df @RT | Tan Delta - ° C. | Snap + Mandrel |
|---|---|---|---|---|---|---|---|
| $TiO_2$/ $SiO_2$ | 0/100 | 0.9 | 213 | 43 | 0.00269 | 263 | 2x |

As shown in Table 4, the addition of filler containing titanium(IV) oxide and silicon oxide improves the inverter life of magnet wire having PI enamel. The addition of a PAI topcoat over filled PI enamel may also provide improved repeated scrape results.

For voltage endurance testing, a 3500 volt signal was communicated onto the wire samples at approximately 155° C. at approximately 10% elongation, where the elongation imparts additional stresses onto the wire. A time to failure was then measured for each of the wire samples. The Df and Tan Delta testing measures losses in the electrical insulation of the wire samples.

As shown in Table 4, higher amounts of titanium(IV) oxide provide improved voltage endurance; however, the higher amounts of titanium(IV) oxide also contribute to increased electrical losses in the insulation as exhibited by the Df and tan delta values. Similarly, higher amounts of silicon oxide provide for less electrical losses in the insulation while having lower voltage endurance performance. Insulation performance can be optimized with blends of titanium(IV) oxide and silicon oxide as a filler. For example, insulation performance can be optimized with a filler including between approximately 20% and approximately 80% by weight of titanium(IV) oxide and between approximately 20% and approximately 80% by weight of silicon oxide. In one example embodiment, improved performance can be achieved with a filler than includes between approximately 60% and approximately 80% by weight of titanium(IV) oxide and between approximately 20% and 40% by weight of silicon oxide.

A fifth example illustrated in Table 5 evaluates the effects of adding fillers to PI on the thermal conductivity of the insulation. Additionally, the thermal conductivity of filled PI insulation is compared to conventional unfilled PI insulation. For the filled PI wire sample referenced in Table 5, the filled PI insulation included approximately 15% of filler by weight. Additionally, the filler included approximately equal amounts by weight of titanium(IV) oxide and silicon oxide. The thicknesses of the filled PI and unfilled PI were approximately equal. Additionally, the thermal conductivities were measured using the ASTM D5470-17 test at approximately 150° C., as established by ASTM International.

TABLE 5

Effects of Filler on Thermal Conductivity of PI

| Insulation Layer | Thermal Conductivity (W/(m K)) |
|---|---|
| Polyimide | 0.1 |
| Filled Polyimide | 0.4 |

As shown in Table 5, the filled polyimide insulation may have a thermal conductivity that is much higher than that of unfilled polyimide. In other words, incorporation of filler material into a base polyimide material will enhance the thermal conductivity of the material. The increased thermal conductivity may be at least twice that of the base polyimide material. As shown in Table 5, the increased thermal conductivity may be approximately four times that of the base polyimide material in certain embodiments. When utilized as magnet wire insulation, the enhanced thermal conductivity of the filled insulation may draw heat away from the magnet wire conductor, thereby allowing the magnet wire to be utilized at higher voltages and enhancing the output of the magnet wire and/or an electric machine into which the magnet wire is incorporated.

Additionally, although the samples included in Tables 2-5 provide for specific blend ratios and overall fill rates (e.g., approximately 15% by weight of the insulation, etc.), a wide variety of other suitable blend ratios and/or fill rates may be utilized in other embodiments.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A magnet wire comprising:

a conductor; and at least one layer of polymeric enamel insulation formed around the conductor, the polymeric enamel insulation comprising a filler dispersed in a base polyimide material, wherein the polymeric enamel insulation has a thermal index of 260° C. or greater.

2. The magnet wire of claim 1, wherein the polymeric enamel insulation has a first thermal conductivity that is at least twice that of a second thermal conductivity of the base polyimide material.

3. The magnet wire of claim 1, wherein the filler comprises at least one of titanium(IV) oxide and silica oxide.

4. The magnet wire of claim 1, wherein the filler comprises between 20 percent and 80 percent by weight of silica oxide and between 20 and 80 percent by weight of titanium (IV) oxide.

5. The magnet wire of claim 1, wherein the filler comprises between 10 percent and 25 percent by weight of the polymeric enamel insulation.

6. The magnet wire of claim 1, wherein the polymeric enamel insulation further comprises an additive comprising an amine moiety reacted with an aldehyde material.

7. The magnet wire of claim 6, wherein the additive comprises Cymel.

8. The magnet wire of claim 1, wherein the at least one layer of polymeric enamel insulation comprises a plurality of layers of polymeric enamel insulation.

9. The magnet wire of claim 1, further comprising a topcoat insulation layer formed around the at least one layer of polymeric enamel insulation.

10. The magnet wire of claim 9, wherein the topcoat insulation layer comprises an unfilled layer.

11. The magnet wire of claim 9, wherein the topcoat insulation layer comprises polyamideimide.

12. The magnet wire of claim 9, wherein the topcoat insulation layer comprises between 5 and 15 percent of a total thickness of the combined polymeric enamel insulation and the topcoat insulation layer.

13. A magnet wire comprising:

a conductor; and filled polymeric enamel insulation formed around the conductor, the filled polymeric enamel insulation comprising between 10 percent and 25 percent by weight of a filler dispersed in a base polymeric material, wherein the filled polymeric enamel insulation has a thermal index of 260° C. or greater, and wherein the filled polymeric enamel insulation has a first thermal conductivity that is at least twice that of a second thermal conductivity for the base polymeric material.

14. The magnet wire of claim 13, wherein the filler comprises at least one of titanium(IV) oxide and silica oxide.

15. The magnet wire of claim 13 wherein the filler comprises between 20 percent and 80 percent by weight of silica oxide and between 20 and 80 percent by weight of titanium(IV) oxide.

16. The magnet wire of claim 13, wherein the filler comprises between 15 percent and 20 percent by weight of the filled polymeric enamel insulation.

17. The magnet wire of claim 13, wherein the filled polymeric enamel insulation further comprises an additive comprising an amine moiety reacted with an aldehyde material.

18. The magnet wire of claim 13, wherein the filled polymeric enamel insulation comprises a plurality of layers of polymeric enamel insulation.

19. The magnet wire of claim 13, further comprising a topcoat insulation layer formed around the filled polymeric enamel insulation.

20. The magnet wire of claim 19, wherein the topcoat insulation layer comprises between 5 and 15 percent of a total thickness of the combined filled polymeric enamel insulation and the topcoat insulation layer.

* * * * *